United States Patent
Beaver

[15] 3,648,160
[45] Mar. 7, 1972

[54] METHOD AND APPARATUS FOR THE HIGHLY ACCURATE, AUTOMATIC DETERMINATION OF THE HEMATOCRIT OF WHOLE BLOOD SAMPLES

[72] Inventor: Murray W. Beaver, Yonkers, N.Y.
[73] Assignee: Technicon Corporation, Tarrytown, N.Y.
[22] Filed: Dec. 1, 1969
[21] Appl. No.: 881,212

[52] U.S. Cl. .............................. 324/30 B, 324/71, 23/230, 73/61
[51] Int. Cl. ..................................................... G01n 27/42
[58] Field of Search .............. 324/30, 30 B, 71 PC; 23/230 B; 73/61; 235/151.3, 151.35, 92

[56] References Cited

UNITED STATES PATENTS

| | | | |
|---|---|---|---|
| 3,003,103 | 10/1961 | Smals | 324/30 |
| 3,056,919 | 10/1962 | Kuipers | 324/30 |
| 3,358,223 | 12/1967 | Birnstingl | 324/30 |

Primary Examiner—Michael J. Lynch
Attorney—Saverio P. Tedesco and Stephen E. Rockwell

[57] ABSTRACT

New and improved method and apparatus for determining the percentage volume of cells in a conductive liquid are provided and comprise means to provide a reference signal, detector means operable in response to said reference signal to detect the conductance of said liquid and provide a conductance signal, means to modify said conductance signal in accordance with the conductance of a portion of said liquid from which said cells have been removed, means to further modify said conductance signal in accordance with a cell shape factor, and means to respectively sum, convert and divide said signals to provide indicia of said percentage cell volume. In a second embodiment, temperature responsive means are substituted for said first-mentioned conductance signal modifying means and are operative to modify said conductance signal in accordance with changes in ambient temperature.

28 Claims, 3 Drawing Figures

Patented March 7, 1972

INVENTOR
MURRAY W. BEAVER
BY
James J. Romano, Jr.
ATTORNEY

Patented March 7, 1972 3,648,160
2 Sheets-Sheet 1
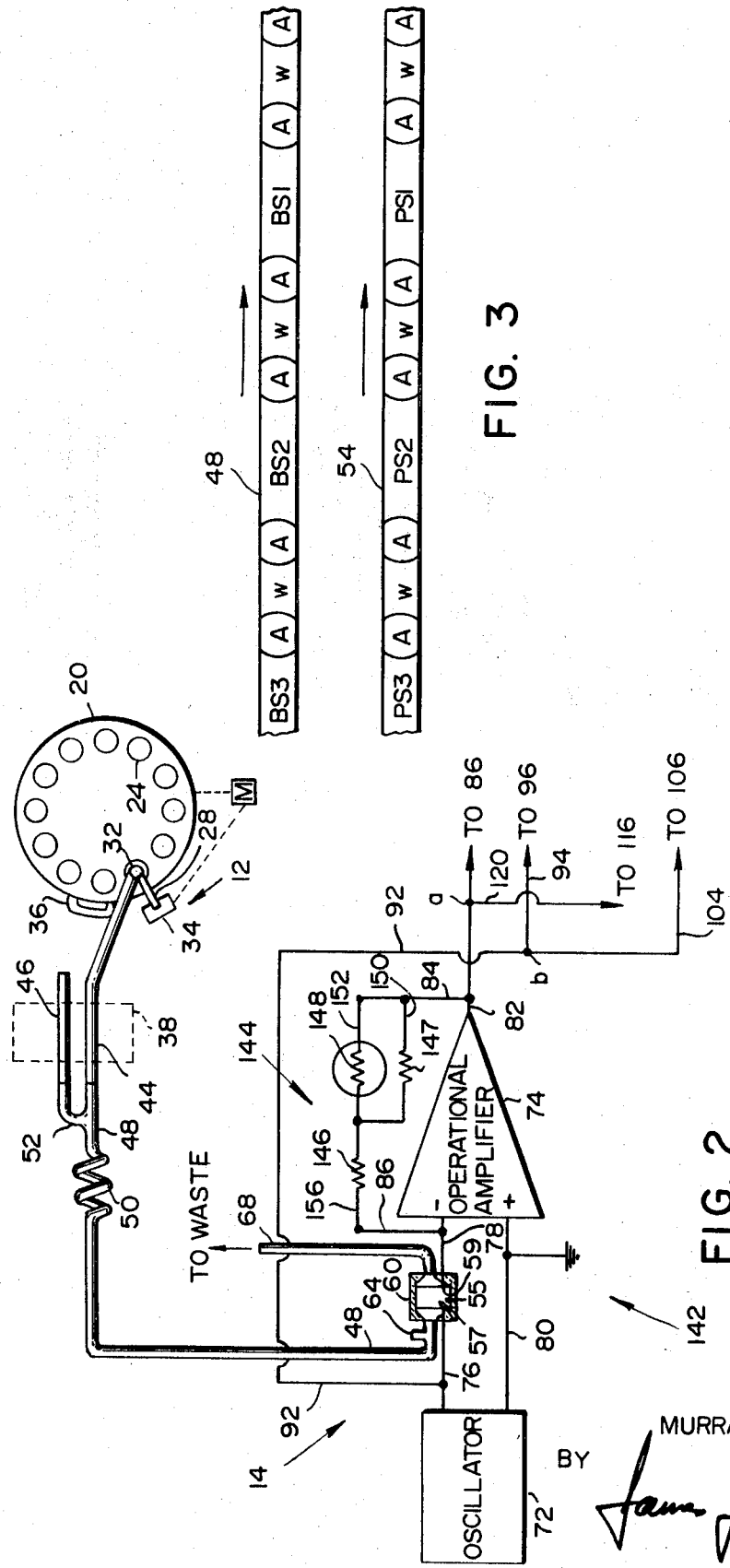
FIG. 3
FIG. 2
INVENTOR
MURRAY W. BEAVER
BY
ATTORNEY

METHOD AND APPARATUS FOR THE HIGHLY ACCURATE, AUTOMATIC DETERMINATION OF THE HEMATOCRIT OF WHOLE BLOOD SAMPLES

BACKGROUND OF THE INVENTION

1. Field of the Invention

This invention relates to new and improved method and apparatus for the consistently highly accurate, rapid and automatic determination of the red cell volume hematocrit of whole blood samples.

2. Description of the Prior Art

Although a variety of methods and apparatus are known in the prior art for the determination of the hematocrit of whole blood samples for essential diagnostic use, no prior art method and/or apparatus is known which can effect hematocrit determination in fully automatic, rapid and consistently highly accurate manner with minimum demands on the time and skills of the apparatus operator.

More specifically, and considering first the substantially manual classic methods and apparatus for hematocrit determination in the nature, for example, of centrifugation and subsequent visual determination of the packed red cell volume, the disadvantages of undue time consumption, and inaccuracy as occasioned by technician error, incompetence and/or general inattention are so well known to those skilled in this art as to require no elaboration here.

On the other hand, although a variety of automatic, and semiautomatic methods and apparatus are known for hematocrit determination, the same will generally be found to be incapable of providing such determination in consistently highly accurate, rapid and automatic manner. More specifically, such apparatus which are generally operable through the determination of the conductance of the whole blood sample in manner well known by those skilled in this art, will be found to be somewhat unstable and to require frequent and demanding adjustments in the nature of calibration and the like to impose an undue burden upon the time of the operator and greatly enhance the possibility of misadjustment with attendant erroneous results. In addition, no method and/or apparatus for hematocrit determination on the basis of the determination of the conductance of the whole blood sample, are known, whether manual, semiautomatic or automatic, which take into consideration the possible variation in the conductance of the plasma and the effect thereof upon the determination of the conductance of the whole blood sample, thus rendering improbable the provision of a truly accurate hematocrit determination in instances wherein the whole blood sample of interest is taken from a gravely ill patient and includes plasma of highly unusual conductance.

OBJECTS OF THE INVENTION

It is, accordingly, an object of this invention to provide new and improved method and apparatus for the consistently highly accurate, rapid and automatic determination of the hematocrit of whole blood samples.

Another object of this invention is the provision of, as above, including single point calibration means which enable the rapid and convenient, highly accurate calibration thereof.

Another object of this invention is the provision of method and apparatus, as above which operate to determine the hematocrit of the whole blood sample on the basis of the determination of the conductance thereof through appropriate circuit means of closed-loop configuration, whereby reasonable variation in the operational characteristics of the circuit components will cancel out so as not to significantly affect the accuracy of the provided results.

Another object of this invention is the provision of method and apparatus which, in one disclosed embodiment thereof, operate to determine the hematocrit of the whole blood sample on the basis of the determination of the conductance thereof, and further include means to independently determine the conductance of the blood plasma and to modify the hematocrit determination in accordance therewith to thus insure the high accuracy of the hematocrit determination.

A further object of this invention is the provision of apparatus as above, which require the use of only readily available components of proven dependability in the fabrication thereof to thus insure long periods of satisfactory, substantially maintenance-free apparatus operation.

A still further object of the invention is the provision of method and apparatus as above, which are particularly adapted to the successive determination of the hematocrit of each of a plurality of whole blood samples which are supplied thereto in series stream form and are separated, each from the other within said stream, by a suitable separating fluid or fluids.

SUMMARY OF THE INVENTION

As disclosed herein in a first embodiment, the apparatus of my invention comprise operatively associated detector means, signal conversion means, and strip chart recorder means, respectively, and are operable in the manner of analog instrumentation to successively determine the hematocrit of each of a plurality of whole blood samples through the determination of the conductance thereof and the solution of the basic Frick-Curtis or Maxwell hematocrit equation as rewritten through the equivalent transformation of the resistance parameters to conductance parameters.

To this effect, the detector means include whole blood sample and blood plasma sample conductivity flow cells through which are concomitantly flowed by sample supply means a whole blood sample and a blood plasma sample therefrom, and oscillator and operational amplifier means, respectively. One input of said amplifier means is constituted by the reference output voltage from said oscillator means while the other amplifier input is constituted by said reference output voltage as applied through said whole blood sample conductivity flow cell and is thus indicative of the conductance of said whole blood sample. A negative feedback path is provided for the application of a negative feedback signal to said operational amplifier through said blood plasma sample conductivity flow cell to modify the amplifier output in accordance with the conductance of said blood plasma sample.

The respective oscillator and operational amplifier means outputs are summed in accordance with the terms of said equation and respectively applied to said signal conversion means which convert the same to DC voltages of appropriate levels and apply the same to said strip chart recorder in such manner that the latter functions to divide said DC voltages, again in accordance with the terms of said equation, and provide for a recorder deflection which is directly indicative of the whole blood sample hematocrit of interest. Since the conductance of whole blood and of blood plasma vary quite precisely the same amount per degree centigrade change in ambient temperature, and since the respective conductances thereof are arranged respectively as numerator and denominator in said hematocrit equation, variations in said conductances due to any ambient temperature variation will cancel, and thus render the operation of the apparatus substantially independent of variation in ambient temperature.

In a second embodiment, the apparatus of the invention is operable through the determination of the conductance of the whole blood sample, only, through use of a whole blood sample conductivity cell arranged as above. A temperature-compensating resistor-thermistor network is substituted for the blood plasma sample conductivity flow cell in the negative feedback path of the operational amplifier, and said resistor-thermistor network is arranged so that the resistance of the network varies precisely in accordance with the variation in conductance of the whole blood sample per change in degree centigrade in the ambient temperature. In addition, the resistance of said temperature-compensating network is chosen to be equivalent to the average conductance of blood plasma.

Single point calibration means are provided in both of the disclosed embodiments of the apparatus and take the form of potentiometer means which are readily and conveniently adjustable to introduce a cell shape factor which appears in said hematocrit equation into the operation of the apparatus to insure the accuracy thereof.

DESCRIPTION OF THE DRAWINGS

The above and other objects and significant advantages of the method and apparatus of this invention are believed made clear by the following description thereof taken in conjunction with the accompanying drawings wherein:

FIG. 2 is a generally schematic diagram of a second embodiment of the apparatus of the invention; and FIG. 3 illustrates the respective series streams of whole blood samples and blood plasma samples which are supplied to the apparatus of FIG. 1.

DETAILED DESCRIPTION OF THE INVENTION

Figure 1:
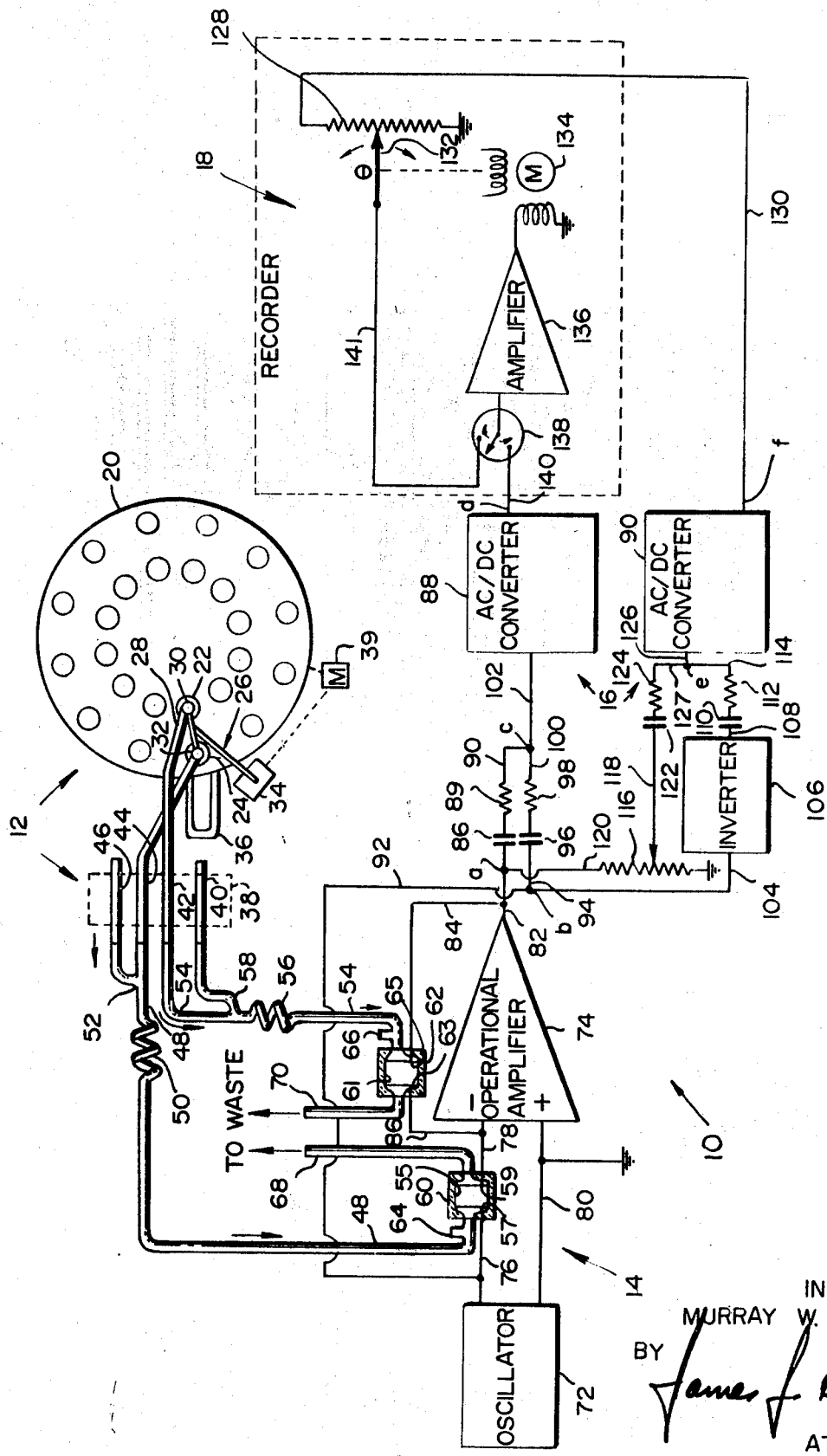
FIG. 1 is a generally schematic diagram of a first embodiment of the apparatus of the invention.

Referring now to FIG. 1, new and improved apparatus for the automatic determination of the hematocrit of each of a series of blood samples constructed and operable in accordance with the teachings of this invention are indicated generally at 10, and comprise blood sample supply means as indicated generally at 12, detector means as indicated generally at 14, signal conversion and peak detection means as indicated generally at 16, and recorder means as indicated generally at 18, respectively.

The sample supply means 12 may, for example, take the general form of those shown and described in U.S. Pat. No. 3,143,263, issued May 26, 1964 to Edward B. M. DeJong, or U.S. Pat. No. 3,252,330 issued May 24, 1966 to Nelson G. Kling, and comprise a turntable 20 upon which are disposed generally concentric, circular arrays of radially aligned whole blood sample containers 22 and blood plasma sample containers 24. A sample offtake device is indicated generally at 26 and comprises operating arm means 28 from which are supported a whole blood sample probe 32 and a blood plasma sample probe 30, respectively. The probe operating arm is operated as described hereinbelow from probe operating arm operating means as indicated at 34. A wash liquid receptacle 36 is disposed as shown adjacent the turntable 20 and may be understood to contain a supply of any suitable wash liquid in the nature, for example, of water.

A compressible tube or peristaltic proportioning pump which may, for example, take the general form of that shown and described in U.S. Pat. No. 3,227,091 issued Jan. 4, 1966 to Jack Isreeli, et al., is indicated generally in dashed lines at 38 and, as utilized herein, may be seen to comprise a plurality of resilient, compressible pump tubes 40, 42, 44 and 46, respectively, each of which is progressively compressed by a plurality of nonillustrated pump rollers, in synchronous manner, to pump fluids therethrough at precisely predetermined flow rates in the direction indicated by the flow directional arrows in FIG. 1.

The inlet end of the compressible pump tube 44 is, as shown to the outlet end of the whole blood sample probe 32, while the outlet end of said compressible pump tube is connected as shown, to a whole blood sample supply conduit 48 which includes a mixing coil 50. The inlet end of compressible pump tube 46 is left open, as shown, to atmosphere, while the outlet end of this compressible pump tube is merged as shown with whole blood sample supply conduit 48 through a junction conduit 52.

In like manner, the inlet end of the compressible pump tube 42 is connected as shown, to the outlet of blood plasma sample probe 30, while the outlet end of this compressible pump tube is connected as shown, to a blood plasma sample supply conduit 54 which includes a mixing coil 56. The inlet end of compressible pump tube 40 is left open to atmosphere, while the outlet end thereof is connected to the blood plasma sample supply conduit 54 through junction conduit 58.

A whole blood sample conductivity flow cell is indicated at 60, and a blood plasma sample conductivity flow cell is indicated at 62, and each of said flow cells may be of the same generally conventional construction, comprising a nonillustrated fluid flow area which extends therethrough, and a pair of spaced, ring electrodes 57 and 59 for cell 60 and 63 and 65 for cell 62, and disposed therein to enable the determination of the conductivity of the fluid flowing therethrough. Debubbler means indicated at 64 are disposed, as shown, in whole blood sample supply conduit 48 immediately upstream of the blood sample conductivity flow cell 60, while debubbler means indicated at 66 are similarly disposed in the blood plasma sample supply conduit 54 immediately upstream of the blood plasma sample conductivity flow cell 62. The outlet of the blood sample supply conduit 48 is, as shown, to the inlet of the whole blood sample conductivity flow cell 60, while an outlet conduit 68 connects the outlet of said flow cell to waste. In like manner, the outlet of blood plasma sample supply conduit 54 is, as shown, to the inlet of the blood plasma sample conductivity flow cell 62, while an outlet conduit 70 connects the outlet of said flow cell to waste.

As oscillator is indicated at 72 and an operational amplifier is indicated at 74, it being understood that the transfer function, and accordingly the output of the latter, may be determined and controlled through the appropriate determination and control of the respective impedances of the external networks, as described in detail hereinbelow. For use as disclosed herein, the oscillator 72 will preferably be arranged to provide a 10 kHz. sine wave output signal at approximately 0.15 v r.m.s. to minimize flow cell electrode impedance effects and improve accuracy. The sine wave output of the oscillator 72 is applied by line 76 to the ring electrode 57 of the whole blood sample conductivity flow cell 60, while the electrical output from said flow cell is applied from the ring electrode 59 as an input to the operational amplifier 74 by line 78. In addition, the output of the oscillator 72 is applied directly as the other input to the operational amplifier 74 by line 80.

The output from the operational amplifier 74 is applied by lines 82 and 84 to the ring electrode 65 of the blood plasma sample conductivity flow cell 62, while the electrical output from said flow cell is applied from the flow cell ring electrode 63 as a negative feedback input to said operational amplifier by line 86.

Referring now to the signal conversion means 16, the same may comprise AC/DC conversion circuits indicated schematically at 88 and 90, respectively. Each of the circuits 88 and 90 functions as a precision peak detector to convert the AC sine wave input signal applied thereto to a DC output voltage while maintaining a precise balance between the peak of said applied AC input signal and the level of the developed DC voltage output. As such, each of the AC/DC conversion circuits 88 and 90 may take any one of a wide variety of circuit configurations which are suitable to the performance of this function as generally discussed, for example, in "Application Manual for Computing Amplifiers for Modelling, Measuring, Manipulating and Much Else" published by Philbrick Researchers Incorporated in 1966.

The AC reference voltage output of the oscillator 72 and the AC voltage output of the operational amplifier 74 are AC coupled, through appropriate resistive summing networks, to the inputs of the AC/DC conversion circuits 88 and 90.

More specifically, the AC voltage output from the operational amplifier 74 is coupled from line 82 through capacitor 86 and summing resistor 89 to line 90, while the AC reference voltage output from oscillator 72 is coupled from lines 92 and 94 through capacitor 96 and summing resistor 98 to line 100 which connects, as shown, with line 90 to provide the input to the AC/DC conversion circuit 88 on line 102.

The AC reference voltage output from the oscillator 72 is applied by line 104 to a unity gain inverter 106, and the output of the latter is coupled by line 108 through capacitor 110 to a summing resistor 112 in line 114, and therefrom to line 126. Potentiometer means 116, as utilized herein, function as passive divider means and comprise a slideable arm 118, and modify the input to the AC/DC conversion circuit 90 in accordance with a cell shape factor to enable advantageous single point calibration of the apparatus 10, as described in detail hereinbelow. The output from the operational amplifier 74 is applied from line 82 to the potentiometer 116 by line 120. The output from the slideable arm 118 of potentiometer 116 is coupled through capacitor 122 and a summing resistor 124 in line 127 to line 126 for application of the AC signal input to the AC/DC conversion circuit 90.

Referring now to the DC strip chart recorder 18, the same may, for example, take the form of those shown and described in U.S. Pat. No. 3,241,432 issued Mar. 22, 1966 to Leonard P. Skeggs, et al. As such, said DC strip chart recorder may comprise a null-type balancing circuit which includes a recorder slide wire 128 to which the DC voltage output signal from AC/DC conversion circuit 90 is applied by line 130. The slide wire 128 is is substantially linear from ground to upper end. An arm 132 is driveable by a servo motor 134 to be moveable across the slide wire 128 through a deflection $\theta$, and it may be understood that the nonillustrated recording pen or stylus of the strip chart recorder 18 is, of course, operatively connected with said arm so as to be moveable therewith through said deflection $\theta$.

An amplifier 136 operates the servomotor 134 in conventional manner. Chopper means which may, for example, be operable at sixty cycles per second, are indicated at 138. One input to the chopper means 138 is provided by the DC voltage output from the AC/DC conversion circuit 88 along line 140, while the other input to said chopper means is constituted by the voltage taken off the slide wire 128 by the arm 132 which is applied to said chopper means along line 141.

A second embodiment of the apparatus of this invention is indicated generally at 142 in FIG. 2 and differs from the apparatus 10 of FIG. 1 only insofar as the respective sample supply means 12 and detector means 14 are concerned, only these particular components of the apparatus 142 being specifically depicted in FIG. 2 for connection to the signal conversion circuits 88 and 90 in the manner shown in FIG. 1. In the embodiment of FIG. 2, the blood plasma sample conductivity flow cell 62, and its operatively associated blood plasma sample supply means have been eliminated from the negative feedback path of the operational amplifier 74, and a temperature stabilized resistor-thermistor network as generally indicated at 144 has been substituted therefor. Also the respective circular array of blood plasma sample containers 22, the blood plasma sample probe 30, the respective compressible pump tubes 40 and 42, and the respective blood plasma sample supply and outlet conduits 54 and 70 have been eliminated from the sample supply device 12, along with the elimination of the blood plasma sample conductivity flow cell 62 from the detector means 14.

Referring now to the resistor-thermistor temperature stabilization network 144, the same may comprise a linearizing resistor 147 and a thermistor 148 which are connected in parallel by lines 150 and 152, and a linearizing resistor 146 which is connected in series therewith by line 156.

OPERATION

In FIG. 1, the whole blood sample container 24 and blood plasma sample container 22 of each of the radially aligned pairs thereof on the turntable 20 are filled with a whole blood sample and a blood plasma sample, respectively from the blood of the same patient. In operation, the turntable 20 is intermittently rotated or indexed under the control of drive motor 39 to present each of the radially aligned pairs of whole blood sample and blood plasma sample containers 24 and 22, in turn, to the offtake means 26. Offtake means 26 is intermittently operated, again under the control of drive motor 39, to immerse the respective inlet ends of the whole blood sample and blood plasma sample probes 32 and 30 in the thusly presented container pair for a predetermined period of time to aspirate, through compressible pump tubes 44 and 42, like predetermined measured volumes of the whole blood sample and blood plasma sample therefrom; to then transfer the said probe inlet ends through the ambient air for immersion in the wash liquid receptacle 36 for a predetermined period of time to thus aspirate like, predetermined measured volumes of ambient air followed by like predetermined measured volumes of said wash liquid therethrough; and to then again transfer the said probe inlet ends through the ambient air for immersion in the next presented pair of a whole blood sample container 24 and a blood plasma sample container 22 for a predetermined period of time to thus aspirate other like, predetermined measured volumes of ambient air therethrough and commence the aspiration of like, predetermined measured volumes of the whole blood sample and blood plasma sample from said next presented container pair for pumping through said compressible pump tubes.

As the resultant stream of whole blood samples, spaced each from the other by a segment of air, a slug of wash liquid and a segment of air, flow through blood sample supply conduit 48, the stream will be further segmented by air pumped through pump tube 46 and supplied thereto through junction conduit 52, mixed in mixing coil 50 to insure that said whole blood samples are homogeneous, and flowed through the whole blood sample conductivity flow cell 60 and, from the latter, to waste through whole blood sample outlet conduit 68. The debubbler 64 will function to remove all of the air segments introduced through compressible pump tube 46 and some portions, only, of each of the sample separating air segments therefrom. The primary function of the air segments introduced through compressible pump tube 46 is to assist in removing the residue of a preceding whole blood sample from the mixing coil 50 and blood sample supply conduit 48 to prevent the contamination thereby of a succeeding whole blood sample. In like manner, the similarly configured blood plasma sample stream will be flowed through mixing coil 56 and blood plasma sample supply conduit 54 and through the blood plasma sample conductivity flow cell 62, and therefrom to waste through blood plasma sample outlet conduit 70.

The whole blood sample stream and the blood plasma sample stream in portions of the respective whole blood sample supply conduit 48 and the blood plasma sample supply conduit 54 immediately upstream of the respective conductivity flow cell inlets, and downstream of the respective debubblers 64 and 66, are depicted in FIG. 3. The whole blood sample stream will consist of a series of whole blood samples as indicated at BS1, BS2 and BS3 of substantially equal volumes and spaced, each from the other, by a segment of air A, a slug of wash liquid W and a segment of air A; the blood plasma sample stream will consist of a series of blood plasma samples of substantially equal volumes as indicated at PS1, PS2 and PS3, and spaced, each from the other, by a segment of air A, a slug of wash liquid W, and a segment of air A. FIG. 3 further illustrates that the respective whole blood samples and blood plasma samples are in substantial alignment with regard to time, to insure the substantially concomitant flow, for example, of the whole blood sample BS2 and the blood plasma sample PS2 of the same patient, through the respective whole blood sample conductivity flow cell 60 and the blood plasma sample conductivity flow cell 62.

Prior to a detailed description of the operation of the detector means 14, the AC/DC signal converter means 16, and the recorder means 18, it may be understood that the basic Frick-Curtis or Maxwell Equation which determines the percentage volume of cells in a homogeneously mixed solution may be written in conductance parameters as follows:

$$H = \frac{1 - \frac{Gb}{Gp}}{1 + K\frac{Gb}{Gp}} X \frac{Eo}{Eo} = \theta \quad (1)$$

wherein $H$ equals hematocrit, $Gb$ equals the conductance of the whole blood sample, $Gp$ equals the conductance of the blood plasma sample, $Eo$ equals the output voltage of the oscillator, and $K$ equals the cell shape factor which is dependent upon the shape of the blood cells as the same flow through the blood sample conductivity flow cell and is always less than one. Accordingly, the respective detector means 14, the AC/DC signal converter means 16, and the recorder means 18, in reality, constitute analog instrumentation to effect the solution of this equation and the display of the results thereof in terms of the deflection $\theta$ of the strip chart recorder arm 132 for each of the whole blood samples of interest.

With this in view, and assuming steady-state operational conditions to have been reached and the respective whole blood sample BS2 and blood plasma sample PS2 to be completely filling and flowing through the respective whole blood sample conductivity flow cell volume 55 and the blood plasma sample conductivity flow cell volume 61, the 10 kHz. output $E o$ of the oscillator 72 modified by the conductance of the whole blood sample BS2 will be applied from the flow cell electrode 59 on line 78 as one input to the operational amplifier 74, while said oscillator output will be applied directly to said operational amplifier as the other input thereof on line 80. In addition, a negative feedback signal will be applied to said operational amplifier on lines 86 and 78 from the electrode 63 of the blood plasma sample conductivity flow cell 62. The magnitude of this negative feedback signal will be determined in accordance with the conductance $G p$ of said blood plasma sample to precisely correct the amplifier output $E a$ for variation in said blood plasma sample conductance to insure that the former is precisely indicative of the hematocrit or packed cell volume of the whole blood sample BS2.

More specifically, the conductance $G p$ of a blood plasma sample, which contains no cells, can differ by as much as 15 percent from the mean conductance of the whole blood from which said blood plasma sample is taken. Accordingly, unless provision is made for this possible variation in the conductance $G p$ of the blood plasma, it is impossible to precisely ascertain whether the measured conductance $G b$ of the whole blood sample is truly indicative of the packed cell volume thereof or, in the alternative, is representative of such cell volume as modified, for example, by an unusually conductive blood plasma. Without the provision of this negative feedback to the operational amplifier 74 in accordance with the conductance $G p$ of the blood plasma, it is possible, for example, when the whole blood sample contains plasma which is unusually highly conductive, to obtain an unusually high whole blood sample conductance $G b$ due principally to the high conductance $G p$ of the plasma rather than to an unusually low packed cell volume of said whole blood sample and would not be truly indicative of the hematocrit thereof.

The resultant operational amplifier output voltage Ea which appears, for example, at point $a$, will be equal to $-Eo\ Gb/Gp$. Such voltage is negative because blood is substantially resistive at the 10 kHz. oscillator frequency used to thus provide resistive networks, only, in the respective input and feedback paths of the operational amplifier 74 with resultant provision of an output from the latter which is 180° out of phase with the reference phase of the oscillator output voltage.

The appearance of this amplifier output voltage Ea at point $a$, and the concomitant appearance of the oscillator output voltage $E o$ at point $b$ on line 92, will result in the AC coupling of these voltages through capacitors 86 and 96, the summing thereof in summing resistors 89 and 98, and the application of the thusly summed voltages as the input to the AC/DC conversion circuit 88, with the result that the output of the latter as provided at point c on line 140 will be constituted by a DC voltage having a magnitude or level $(1 - (Gb/Gp)) Eo$.

Concomitantly, the oscillator voltage $E o$ is applied on line 104 to the unity gain inverter 106 with an attendant 180° shift in phase, and AC coupled from the latter through capacitor 110 to summing resistor 112; the amplifier output voltage $E a$ applied to calibration potentiometer 116 results in the application of a voltage $-K(Gb/Gp)Eo$ through capacitor 122 to summing resistor 124, with the magnitude of the cell shape factor $K$ being determined by the setting of said potentiometer. More specifically, the blood cell shape factor $K$, which is determined by the configuration of the blood cells as the same flow through the whole blood sample conductivity flow cell 60 and is never more than one as discussed hereinabove, may be accurately and conveniently introduced through proper adjustment, if necessary, of the calibration potentiometer 116. Thus, for example, if $K$ is determined to be equal to 0.85, it is believed clear that appropriate adjustment arm 118 of the calibration potentiometer 116 to apply only 0.85 of the oscillator voltage Eo for coupling through capacitor 122 will function to precisely introduce this $K$ factor into the operation of the apparatus.

The respective voltages $-K(Gb/Gp) - Eo$, and $-Eo$ which has been inverted by the operation of the unity gain inverter 106 are summed at point e and applied therefrom on line 126 to the AC/DC conversion circuit 90, the output of the latter as appears at point $f$ will be constituted by a DC voltage having a level or magnitude $(1 + K(Gb/Gp)) Eo$.

The concomitant application of the DC voltage output $(1 - (Gb/Gp)) Eo$ from point $d$ to the 60-cycle chopper means 138 on line 140, and of the DC voltage output $(1 + K(Gb/Gp)) Eo$ from point $f$ to the recorder slide wire 128 on line 130 will, of course, result in the drive of the recorder arm 132 by the servomotor 134 through an arm deflection $\theta$, until such time as the voltage applied on line 141 to the chopper means 138 is substantially equal to the voltage applied to the latter on line 140. At such time, termination of the operation of the servo motor 134 and movement of the arm 132, that is, of the nonillustrated recording pen or stylus which is attached to said arm, through the deflection $\theta$ indicate the hematocrit of the whole blood sample BS2 of interest.

The apparatus of the invention makes essential use of the respective components of the DC strip chart recorder 18 in performing the essential division step which is, of course, required for appropriate analog instrumentation of the hematocrit Equation 1 as opposed, for example, to the apparatus of the prior art which in essence utilize said recorder solely as a meter. Since the resistance of the recorder slide wire 128 varies substantially linearly along the length thereof as discussed hereinabove, the recorder deflection $\theta$ will be linear with regard to the whole blood sample hematocrit of interest to thus eliminate the need for specially calibrated recorder strip chart paper.

Operation of the apparatus 10 is, of course, automatically continuous, as described, until the hematocrit of each of the whole blood samples has been automatically and precisely determined and indicia thereof provided in readily interpretable and reproducible form on the nonillustrated strip chart of the DC strip chart recorder 18.

In addition to providing for precise correction of the measured conductance $G b$ of the whole blood sample in accordance with variation in the conductance $G p$ of the blood plasma sample, the incorporation of the blood plasma sample conductivity flow cell 62 and control thereby of the magnitude of the negative feedback signal applied to operational amplifier 74 will, in addition, render the operation of the apparatus 10 substantially independent of such ambient temperature changes. More specifically, it has been carefully determined that the conductance of whole blood and blood plasma vary substantially precisely the same 2 percent per degree centigrade change in ambient temperature. Accordingly, and considering again the equation term $Gb/Gp$, variations in the respective whole blood sample conductance Gb and the blood plasma sample conductance $G p$ will be substantially equal for a given change in ambient temperature, to thus substantially prevent variation in the determined whole blood sample hematocrit H on the basis of such ambient temperature variation.

Referring now to the operation of the apparatus 142 of FIG. 2, the same is very similar to the operation as described of the apparatus 10 of FIG. 1 with the exception that no correction will be provided for variation in the blood plasma conductivity Gp in the operation of the former. More specifically, only the whole blood sample stream, as illustrated in part in whole blood sample supply conduit 48 in FIG. 3 is supplied to the apparatus 142, and the negative feedback path of the operational amplifier 74 comprises a temperature compensating resistor-thermistor network 144 which is constituted by thermistor 148 and linearizing resistors 146 and 147. Thermistor 148 is carefully selected so that the network resistance will vary substantially 2 percent per degree centigrade change in ambient temperature. As a result, the magnitude of the negative feedback signal to the operational amplifier 74, as linearized by linearizing resistors 146 and 147, will vary substantially 2 percent per degree centigrade change in ambient temperature to thus insure accuracy of apparatus operation as substantially uneffected by changes in ambient temperature.

Operation of the apparatus 142 to effect satisfactory analog instrumentation solution of Equation 1 is insured by choice of the respective resistance values of the thermistor 148 and the linearizing resistors 146 and 147 such that the magnitude of the negative feedback signal applied therethrough to the operational amplifier 74 will be the substantial equivalent of the magnitude of such negative feedback signal as would be applied through a blood plasma sample having an average or representative conductance $G_p$.

Referring again to the calibration potentiometer 116 of FIG. 1, adjustment thereof to establish the cell shape factor K functions as a single point calibration for the apparatus to significant advantage when compared to the apparatus of the prior art. Such prior art apparatus requires frequent and extensive calibration adjustments and procedures to thus impose an unnecessary burden on the apparatus operator and significantly enhance the likelihood of apparatus misjudgment with resultant inaccuracy of hematocrit results. More specifically, the apparatus 10 of FIG. 1 may be substantially calibrated, for example, to correct for conductivity flow cell aging and the like, by the running of a small number of whole blood samples of known hematocrits and blood plasma samples through the respective conductivity flow cells 60 and 62 and the concomitant adjustment, if necessary, by the apparatus operator of the potentiometer 116 to insure that the deflection $\theta$ of the strip chart recorder arm 132 is equal, in each instance, to the relevant known hematocrit. Thus, and although periodic instrument checks and adjustments may be required to correct for instrument drift and the like, such instrument checks may be readily accomplished in conventional, nonillustrated manner through the provision, for example, of appropriate resistive networks which may be temporarily switched in to accomplish the same.

The calibration of the apparatus 142 of FIG. 2 through adjustment, if necessary, of the potentiometer 116, not shown to select an appropriate cell shape factor K will likewise function to provide for single point calibration of this apparatus. Such single point calibration would, in this instance, preferably be accomplished by the running of an equivalent 50 percent hematocrit solution through the whole blood sample conductivity flow cell 60.

An additionally significant advantage with regard to the apparatus 10 of FIG. 1, and the apparatus 142 of FIG. 2, is the fact that the circuit components thereof are balanced with respect to the output voltage of the oscillator 72, so that any variation in the amplitude of this oscillator voltage does not affect the accuracy of the desired result, since such variation would simply be cancelled out as is believed made clear by Equation 1. As a result, the apparatus as disclosed does not require a superstabilized, relatively expensive oscillator for the provision of the requisite sine wave input voltage. Too, the provision of the closed-loop negative feedback path to the operational amplifier 74 insures that variation in the gain of the latter does not affect the accuracy of the provided results.

Although disclosed as providing the hematocrit results in the form of a graph on a recorder strip chart, it may be understood that application of the respective DC voltage outputs of the AC/DC conversion circuits 88 and 90 to drive digital readout means, for example, fluorescent display tubes and/or digital readout printing means, may be readily effected.

Although disclosed by way of example hereinabove as applicable to the highly accurate, automatic determination of the hematocrit of a series of whole blood samples, it is believed clear that the apparatus of the invention is by no means limited thereto, but rather would find particular applicability to the highly accurate, automatic determination of the conductance of a wide variety of disassociated ion solution in the nature, for example, of sale solution as might include KCl, HCl and NaCl.

While I have shown and described the preferred embodiment of my invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. In apparatus for determining the percentage volume of cells in a conductive liquid, comprising means to provide a reference signal, means to apply said reference signal across a volume of said liquid and to provide a conductance signal, said reference signal being modified as a function of the conductance of said liquid to provide said conductance signal, means to reduce the magnitude of said conductance signal and to compensate for a particular characteristic of said cells, means to sum said reference signal and said conductance signal so as to provide a first signal, means to sum said reference signal and said modified conductance signal so as to provide a second signal, and means to divide said first signal by said second signal to provide an indication of said percentage volume of cells in said liquid.

2. In apparatus as in claim 1 wherein, said means to provide said reference signal comprise oscillator means, and said means to provide said conductance signal comprise amplifier means for receiving said conductance signal.

3. In apparatus as in claim 1 further comprising, means operable to render said conductance signal substantially independent of changes in ambient temperature.

4. In apparatus as in claim 1, means operable to compensate said conductance signal as a function of the conductance of a portion of said liquid from which said cells have been removed.

5. In apparatus as in claim 2 wherein said amplifier means further comprise feedback means operable to temperature compensate said amplifier means.

6. In apparatus as in claim 2 wherein said amplifier means include feedback means operable to compensate said conductance signal as a function of the conductance of a portion of said liquid from which said cells have been removed, said feedback means including means to sense the conductance of said liquid portion.

7. In apparatus as in claim 6 wherein, said sensing means comprise a conductivity cell containing said liquid portion.

8. In apparatus as in claim 6 wherein, said means to provide said conductance signal comprise a liquid conductivity flow cell across which said reference signal is applied, said sensing means in said feedback means comprise a liquid portion conductivity flow cell, and said apparatus further comprising means to concomitantly flow said liquid and said liquid portion through said liquid conductivity flow cell and said liquid portion conductivity flow cell.

9. In apparatus as in claim 3 wherein, said rendering means comprise a resistor-thermistor network having a resistance which is the equivalent of the average conductance of said liquid upon the removal of said cells therefrom.

10. In apparatus as in claim 5 wherein, said feedback means comprise a temperature responsive resistor-thermistor network.

11. In apparatus as in claim 10 wherein, said temperature responsive resistor-thermistor network has a resistance which is the equivalent of the average conductance of said liquid upon the removal of said cells therefrom.

12. In apparatus as in claim 1 wherein, said means to compensate said conductance signal for said particular characteristic of said cells comprise potentiometer means, and said particular characteristic is the cell shape factor.

13. In apparatus as in claim 5 wherein, said means to compensate said conductance signal for said particular characteristic of said cells comprise potentiometer means, and said particular characteristic is the cell shape factor.

14. In apparatus as in claim 8 wherein, said means to compensate said conductance signal for said particular characteristic of said cells comprise potentiometer means, and said particular characteristic is the cell shape factor.

15. In apparatus as in claim 10 wherein, said means to compensate said conductance signal for said particular characteristic of said cells comprise potentiometer means, and said particular characteristic is the cell shape factor.

16. In apparatus as in claim 2 further including recorder means comprising a DC null-type balancing circuit, and said apparatus further comprise AC/DC signal conversion means connected to said summing means to convert said summed first and second signals to DC signals and apply the same to said recorder means.

17. In apparatus as in claim 16 wherein, said DC null-type balancing circuit comprises a slidewire and operatively associated arm, and a servomotor to drive said arm across said slidewire, and wherein said signal conversion means comprise means to apply said DC signals corresponding to first and second signals to said servomotor and said slidewire, respectively, so as to cause said servomotor to drive said arm across said slidewire to balance said recorder means to indicate said percentage cell volume.

18. In apparatus as in claim 14 further including recorder means comprising a DC null-type balancing circuit, and said apparatus further comprise AC/DC signal conversion means to convert said summed first and second signals to DC signals and apply the same to said recorder means.

19. In apparatus as in claim 18 wherein, said DC null-type balancing circuit comprises a slidewire and operatively associated arm, and a servomotor to drive said arm across said slidewire, and wherein said signal conversion means comprise means to apply said DC signals corresponding to said first and second signals to said servo motor and said slidewire, respectively, so as to cause said servomotor to drive said arm across said slidewire to balance said recorder means to indicate said percentage cell volume.

20. In a method for determining the percentage volume of cells in a conductive liquid, comprising the steps of providing a reference signal, applying said reference signal across a volume of said liquid to modify said reference signal as a function of the conductance of said liquid so as to provide a conductance signal, reducing the magnitude of said conductance signal to compensate for a particular characteristic of said cells, summing said reference signal and said conductance signal to provide a first signal, summing said reference signal and said modified conductance signal to provide a second signal, and dividing said first signal by said second signal to provide an indication of said percentage volume of cells in said conductive liquid.

21. In a method as in claim 20 further comprising the step of compensating said conductance signal for changes in ambient temperature.

22. In a method as in claim 20 further comprising the step of compensating said conductance signal as a function of the conductance of a portion of said liquid from which said cells have been removed.

23. In a method as in claim 22 further comprising the step of sensing the conductance of said liquid portion prior to compensating said conductance signal.

24. In a method as in claim 20 further comprising the steps of amplifying said conductance signal to provide an output signal, and feeding back said output signal across temperature responsive means to compensate said conductance signal for changes in ambient temperature.

25. In apparatus for determining the percentage cell volume of a conductive liquid, comprising means to provide a fixed reference signal, means to apply said reference signal across a volume of said liquid contained in a first conductivity cell, so as to modify said reference signal as a function of the conductance of said liquid and to provide a conductance signal, and means to subsequently receive said conductance signal and to modify said conductance signal as a function of the conductance of a portion of said liquid from which said cells have been removed, said receiving and modifying means including amplifier means having a feedback circuit including a second conductivity cell containing said liquid portion from which said cells have been removed, and means responsive to said modified conductance signal and said reference signal for determining the percentage cell volume of said liquid.

26. In apparatus as in claim 25 further comprising means to concomitantly flow said liquid and said liquid portion through said said first and said second conductivity cells.

27. In apparatus as in claim 25 wherein said receiving means further includes means to reduce the magnitude of said conductance signal in accordance with a particular characteristic of said cells.

28. In a method for determining the percentage cell volume of a conductive liquid, comprising the steps of providing a fixed reference signal, applying said reference signal across a volume of said liquid to modify said reference signal as a function of the conductance of said liquid and to provide a conductance signal, subsequently amplifying said conductance signal to generate an output signal, and feeding back said output signal across a volume of said liquid from which said cells have been removed so as to modify said conductance signal as a function of the conductance of said liquid portion, and receiving said modified conductance signal and said reference signal and determining therefrom the percentage cell volume of said liquid.

* * * * *